US012321130B2

(12) United States Patent
Shimizu et al.

(10) Patent No.: US 12,321,130 B2
(45) Date of Patent: Jun. 3, 2025

(54) CARTRIDGE, PROCESS CARTRIDGE, AND IMAGE FORMING APPARATUS

(71) Applicant: CANON KABUSHIKI KAISHA, Tokyo (JP)

(72) Inventors: Hiroki Shimizu, Suntou-gun (JP); Osamu Anan, Susono (JP); Kazuki Matsumoto, Fuji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/331,661

(22) Filed: Jun. 8, 2023

(65) Prior Publication Data

US 2023/0315008 A1 Oct. 5, 2023

Related U.S. Application Data

(63) Continuation of application No. 17/711,977, filed on Apr. 1, 2022, now Pat. No. 11,709,455, which is a continuation of application No. 17/089,572, filed on Nov. 4, 2020, now Pat. No. 11,320,781, which is a continuation of application No. 16/930,057, filed on Jul. 15, 2020, now Pat. No. 10,859,971, which is a continuation of application No. 16/850,666, filed on Apr. 16, 2020, now Pat. No. 10,747,172, which is a (Continued)

(30) Foreign Application Priority Data

Feb. 10, 2016 (JP) ................................ 2016-023481
Jan. 17, 2017 (JP) ................................ 2017-005846

(51) Int. Cl.
*G03G 21/18* (2006.01)

(52) U.S. Cl.
CPC ....... *G03G 21/1842* (2013.01); *G03G 21/185* (2013.01); *G03G 21/1885* (2013.01)

(58) Field of Classification Search
CPC ............. G03G 21/1885; G03G 21/185; G03G 21/1842
See application file for complete search history.

(56) References Cited

U.S. PATENT DOCUMENTS 5,946,531 A * 8/1999 Miura ................ G03G 15/5041 399/113
6,163,665 A * 12/2000 Watanabe ............ G03G 21/186 399/111

(Continued)

FOREIGN PATENT DOCUMENTS

EP 1326144 A1 * 7/2003 ......... G03G 21/1871
JP 7014202 B2 * 2/2022 ......... G03G 21/1647

*Primary Examiner* — Francis C Gray
(74) *Attorney, Agent, or Firm* — Canon U.S.A., Inc. IP Division

(57) ABSTRACT

A cartridge that can be inserted in an apparatus main body of an image forming apparatus by moving along an axial direction of an image bearing member includes the image bearing member, a frame configured to support the image bearing member, a storage member configured to store therein information on the cartridge, and include an electrical contact, and a first pressed section and a second pressed portion configured to be pressed by the apparatus main body. The electrical contact is disposed between the first pressed section and the second pressed section, and is configured to be in contact with the main body contact on a lower side in a state where the cartridge is attached to the apparatus main body.

9 Claims, 12 Drawing Sheets

Related U.S. Application Data continuation of application No. 16/704,928, filed on Dec. 5, 2019, now Pat. No. 10,656,593, which is a continuation of application No. 16/531,657, filed on Aug. 5, 2019, now Pat. No. 10,635,046, which is a continuation of application No. 15/978,706, filed on May 14, 2018, now Pat. No. 10,416,608, which is a continuation of application No. 15/423,487, filed on Feb. 2, 2017, now Pat. No. 9,996,052.

(56) References Cited

U.S. PATENT DOCUMENTS

| | | | | |
|---|---|---|---|---|
| 7,272,336 | B1 * | 9/2007 | Dawson | G03G 21/1652<br>399/119 |
| 8,737,863 | B2 * | 5/2014 | Cho | G03G 21/1885<br>399/109 |
| 9,625,876 | B2 * | 4/2017 | Watanabe | G03G 21/1633 |
| 11,029,640 | B1 * | 6/2021 | Komatsu | G03G 21/1842 |
| 2003/0123896 | A1 * | 7/2003 | Goto | G03G 21/1885<br>399/90 |
| 2008/0240774 | A1 * | 10/2008 | Fukamachi | G03G 15/0865<br>399/111 |
| 2017/0031312 | A1 * | 2/2017 | Seto | G03G 21/185 |
| 2021/0200141 | A1 * | 7/2021 | Kawaguchi | G03G 21/1652 |

* cited by examiner

CARTRIDGE, PROCESS CARTRIDGE, AND IMAGE FORMING APPARATUS

CROSS-REFERENCE TO RELATED APPLICATIONS

This application is a continuation of U.S. patent application Ser. No. 17/711,977, filed on Apr. 1, 2022, which is a continuation of U.S. patent application Ser. No. 17/089,572, filed on Nov. 4, 2020, now U.S. Pat. No. 11,320,781, issued on May 3, 2022, which is a continuation of U.S. patent application Ser. No. 16/930,057, filed on Jul. 15, 2020, now U.S. Pat. No. 10,859,971, issued on Dec. 8, 2020, which is a continuation of U.S. patent application Ser. No. 16/850,666, filed on Apr. 16, 2020, now U.S. Pat. No. 10,747,172, issued on Aug. 18, 2020 which is a continuation of U.S. patent application Ser. No. 16/704,928, filed on Dec. 5, 2019, now U.S. Pat. No. 10,656,593, issued on May 19, 2020, which is a continuation of U.S. patent application Ser. No. 16/531,657, filed on Aug. 5, 2019, now U.S. Pat. No. 10,635,046, issued on Apr. 28, 2020, which is a continuation of U.S. patent application Ser. No. 15/978,706, filed on May 14, 2018, now U.S. Pat. No. 10,416,608, issued on Sep. 17, 2019, which is a continuation of Ser. No. 15/423,487, filed on Feb. 2, 2017, now U.S. Pat. No. 9,996,052 issued on Jun. 12, 2018, which claims the benefit of and priority to, Japanese Patent Application No. 2016-023481, filed Feb. 10, 2016, and Japanese Patent Application No. 2017-005846, filed Jan. 17, 2017, both of which are hereby incorporated by reference herein in their entireties.

BACKGROUND OF THE INVENTION

Field of the Invention

The present disclosure relates generally to a cartridge, a process cartridge, and an image forming apparatus. Suitable examples of image forming apparatuses include a copier, a printer (such as a laser beam printer or a light emitting diode (LED) printer), a fax machine, a word processor, and a multi-function printer having functions of these, employing electrophotography to form an image on a recording medium.

Description of the Related Art

Image forming apparatuses, such as printers employing electrophotography (electrophotographic process), uniformly charge electrophotographic photosensitive members serving as image bearing members. Then, the charged photosensitive members are selectively exposed, whereby electrostatic images are formed on the photosensitive members. Then, the electrostatic images formed on the photosensitive members are visualized as toner images with toner used as a developer. The toner images formed on the photosensitive members are transferred onto a recording medium such as a recording sheet or a plastic sheet. Then, the toner images that have been transferred on the recording medium are heated and pressed to be fixed on the recording medium. Thus, image recording is completed.

Generally, such image forming apparatuses require maintenance for various process units including the photosensitive member, a charging device, a developing device, and a cleaning device. Thus, there have been attempts to facilitate the maintenance for the processing units. More specifically, it has been a common practice to contain various process units in a cartridge, that is, a process cartridge that can be detachably attached to a main body of the image forming apparatus. With this system employing the process cartridge, an image forming apparatus offering high usability can be provided (see, U.S. Pat. No. 8,737,863).

The cleaning device, in the process cartridge described above, includes a photosensitive drum, a charging roller that charges the photosensitive drum, a cleaning member that scrapes off the developer remaining on the photosensitive drum, and a cleaning frame that supports these members. The photosensitive drum is rotatably supported by the cleaning frame via a bearing member.

The cartridge is provided with a storage element storing therein service information and process information. With the information stored in the storage element, the image forming apparatus offers higher image quality and better maintenance performance. The image forming apparatus has an apparatus main body provided with an electrical contact for establishing an electrical connection with a storage element contact provided to the cartridge, and thus electrical communications can be performed between the image forming apparatus and the cartridge.

There have been configurations developed to achieve a stable contact between the storage element contact of the cartridge and the main body electrical contact provided to the apparatus main body. More specifically, one such configuration includes a backup member that presses the cartridge in a direction opposite to a direction in which the apparatus main body presses a connector (see Japanese Patent No. 3809402). Another such configuration includes a rotation stopper for the cartridge arranged such that counter force can be obtained in a direction of offsetting a moment generated in the cartridge by pressing force from the main body electrical contact (see Japanese Patent Application Laid-Open No. 2015-14632). Thus, these configurations can achieve the contact between the electrical contact of the image forming apparatus and the storage element contact of the cartridge.

In this context, FIG. 9 illustrates a conventional configuration in which a storage element is disposed on a side surface on a rear side of a main body of a process cartridge that can be inserted in the apparatus main body of the image forming apparatus by moving along the axial direction of a photosensitive drum. In this configuration, the process cartridge receives force from a main body electrical contact in a direction in which the cartridge is pulled out from the apparatus main body. Thus, large retaining force is required for preventing the process cartridge from falling out, meaning that a user has to apply large force to insert and pull out the cartridge.

What is needed is a cartridge, a process cartridge, and an image forming apparatus offering high usability with the cartridge being easily insertable by a user.

SUMMARY OF THE INVENTION

According to an aspect of the present disclosure, a cartridge according to the present disclosure is a cartridge that is capable of being inserted in an apparatus main body of an image forming apparatus by moving along an axial direction of an image bearing member, and includes the image bearing member, a frame configured to support the image bearing member, a storage member configured to store therein information on the cartridge, and include an electrical contact that is configured to contact a main body contact provided to the apparatus main body, a first pressed section configured to be pressed by the apparatus main body in such a manner that the cartridge is positioned with respect to the apparatus main body, and a second pressed section configured to be pressed by the apparatus main body in such a manner that the cartridge is positioned with respect to the apparatus main body. The storage member is provided to the frame. The electrical contact is disposed between the first pressed section and the second pressed section in the axial direction, and is configured to be able to be in contact with the main body contact on a lower side in a state where the cartridge is attached to the apparatus main body.

Further features of the present disclosure will become apparent from the following description of exemplary embodiments with reference to the attached drawings.

DESCRIPTION OF THE EMBODIMENTS

Preferred exemplary embodiments of the present disclosure are described in detail below with reference to the attached drawings.

(Image Forming Apparatus)

Figure 2:
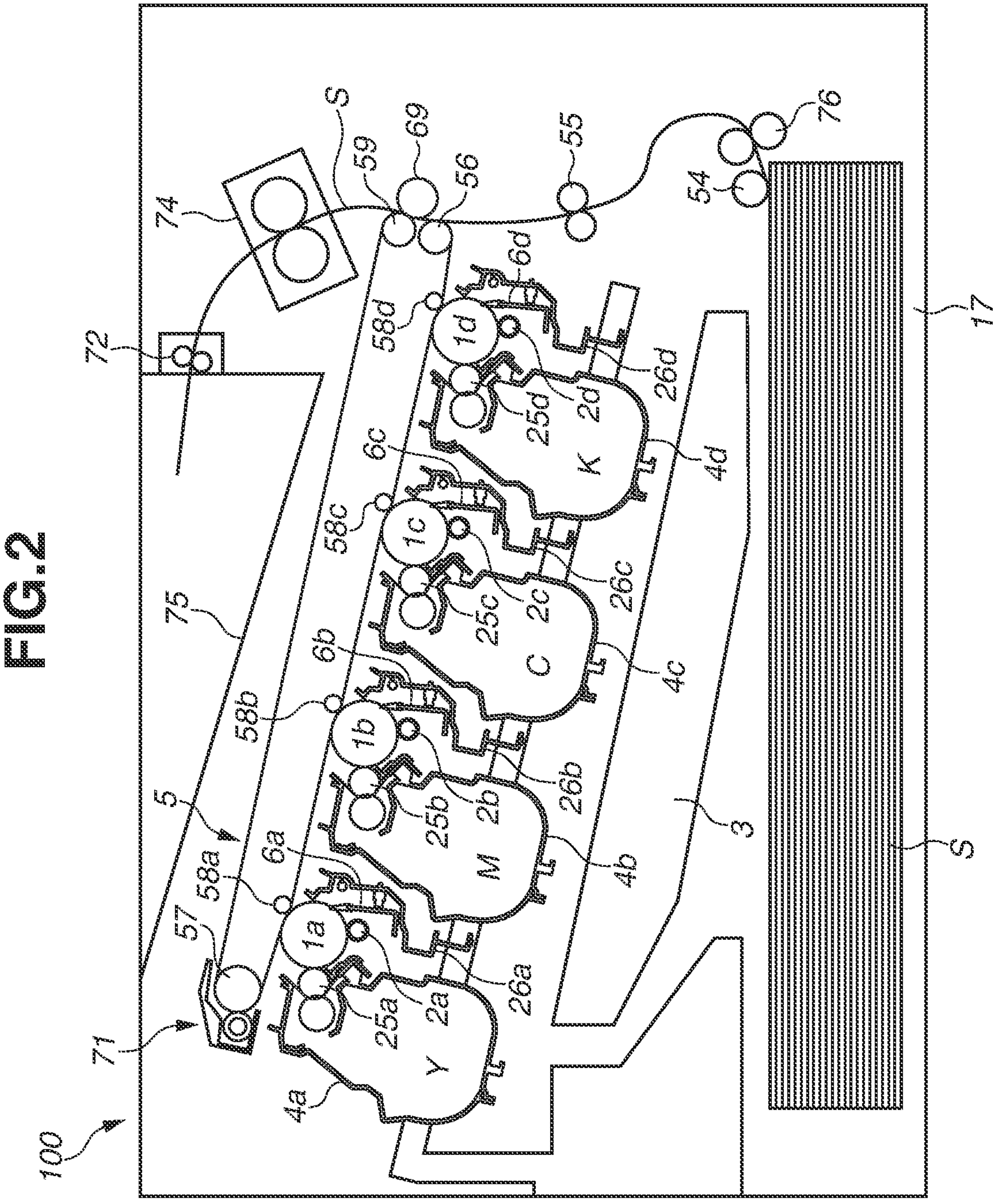
FIG. 2 is a schematic cross-sectional view of an image forming apparatus in which the cartridge according to the first exemplary embodiment is installed.
Figure 3:
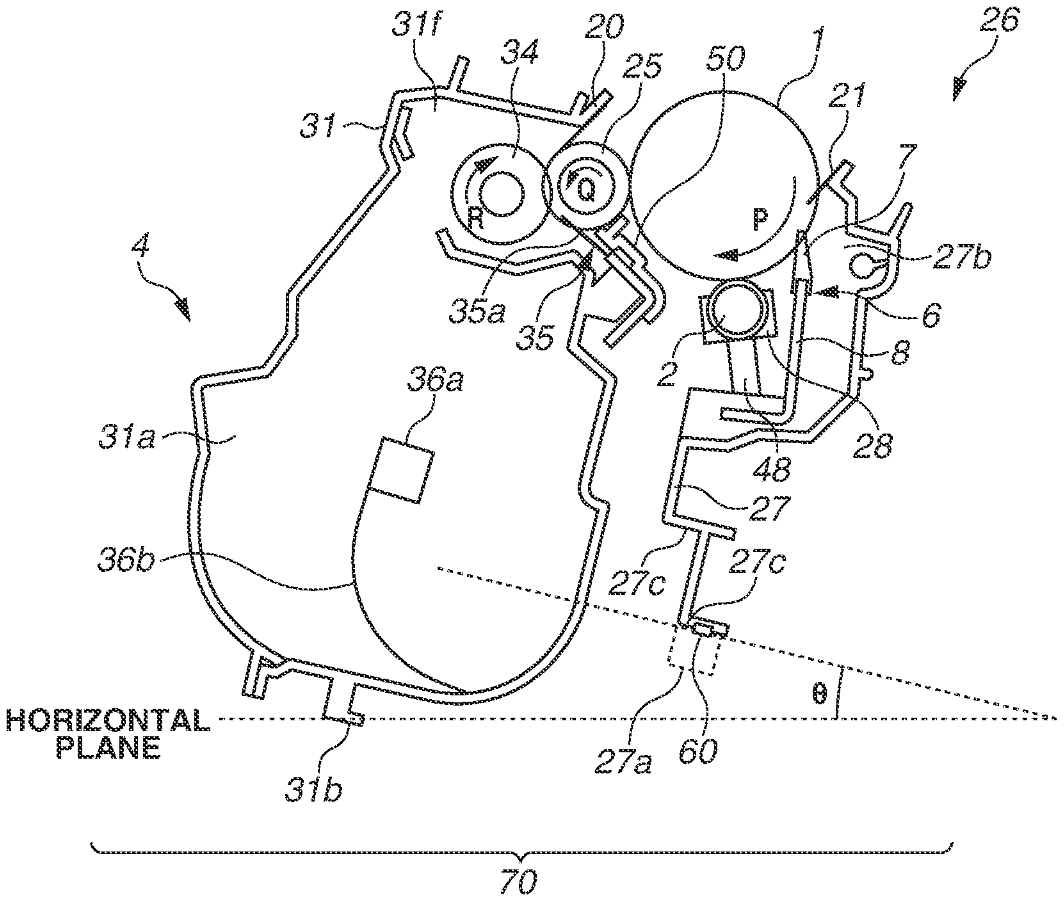
FIG. 3 is a schematic cross-sectional view of the cartridge according to the first exemplary embodiment.

FIG. 2 is a cross-sectional view of an electrophotographic image forming apparatus that has a main body to which a process cartridge according to a first exemplary embodiment can be attached. FIG. 3 is a cross-sectional view of the process cartridge. The process cartridge (hereinafter, referred to as a cartridge) at least includes an image bearing member such as a photosensitive drum. Typically, the cartridge includes the image bearing member and process units that are integrally formed. The process units perform processes on the image bearing member. The main body of the image forming apparatus (hereinafter, referred to as an apparatus main body) corresponds to a portion of the image forming apparatus excluding the cartridge. The cartridge can be attached to the apparatus main body in an inserting manner (detachable manner).

Figure 1:
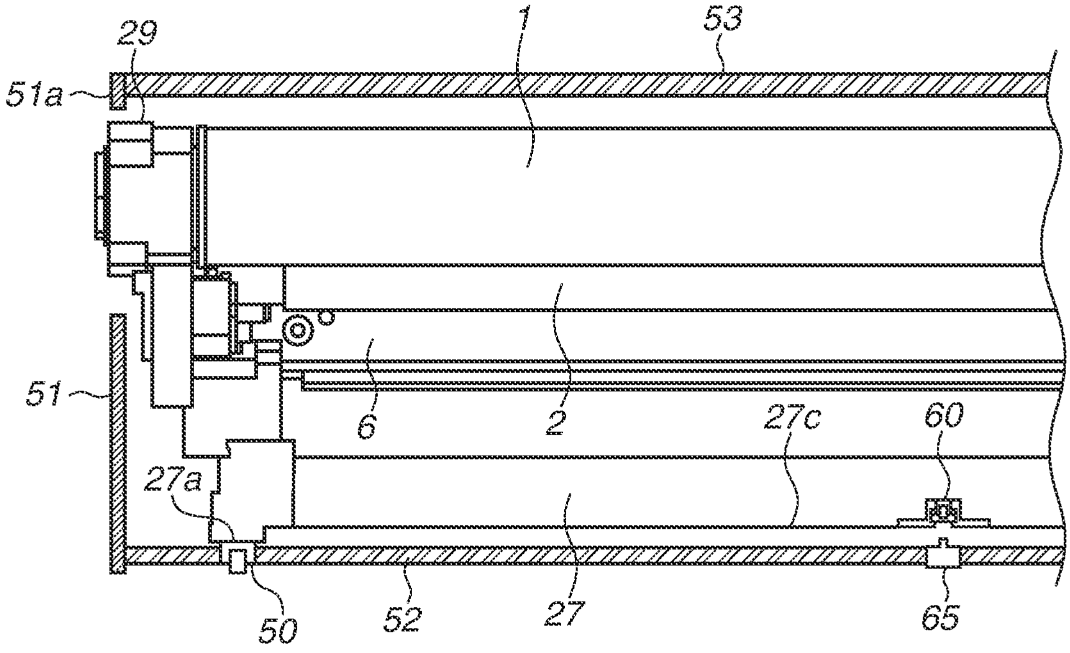
FIG. 1 is a detailed cross-sectional view illustrating how a storage member is arranged in a cartridge according to a first exemplary embodiment.

As illustrated in FIG. 2, four detachable cartridges 70 (70Y, 70M, 70C, and 70K) are attached to an apparatus main body 100 with a lower guide rail 52 and an upper guide rail 53 that are described later (FIG. 1). An upstream side and a downstream side of the apparatus main body 100, in the insertion direction of the cartridges 70, are respectively defined as a front surface side and a rear surface side. In the apparatus main body 100, the cartridges 70 are arranged side by side in a direction inclined with respect to a horizontal direction, as illustrated in FIG. 2.

Each of the cartridges 70 includes an electrophotographic photosensitive drum (hereinafter, referred to as a photosensitive drum) 1 (1*a*, 1*b*, 1*c*, 1*d*) configured to carry a developer image. Process units such as a charging roller 2 (2*a*, 2*b*, 2*c*, 2*d*) serving as a charging member, a developing roller 25 (25*a*, 25*b*, 25*c*, 25*d*), and a cleaning member 6 (6*a*, 6*b*, 6*c*, 6*d*) are integrally formed to be arranged around the photosensitive drum 1.

The charging roller 2 uniformly charges the surface of the photosensitive drum 1. The developing roller 25 develops a latent image formed on the photosensitive drum 1 into a visible image with a developer (toner). The cleaning member 6 removes toner remaining on the photosensitive drum 1, after a toner image formed on the photosensitive drum 1 has been transferred onto a recording medium.

A scanner unit 3 is provided below the cartridges 70. The scanner unit 3 selectively exposes the photosensitive drums 1 based on image information so that the latent image is formed on the photosensitive drums 1. A cassette 17 is installed in a lower portion of the apparatus main body 100 and accommodates a recording medium S. In the present exemplary embodiment, recording paper is described as the recording medium. However, the recording medium in the present disclosure is not limited to paper. Generally, the recording medium is a sheet member on which a toner image is formed by the image forming apparatus. Examples of the recording medium include normal paper of a standard or special size, thick paper, thin paper, an envelope, a postcard, a sticker, a resin sheet, an overhead projector (OHP) sheet, and glossy paper.

A recording medium conveyance unit is provided such that the recording medium S is conveyed to an upper portion of the apparatus main body 100 through a secondary transfer roller 69 and a fixing unit 74. More specifically, a feed roller 54 is provided to separate recording media S in the cassette 17 into individual sheets and feed the sheet. Conveyance rollers 76 are provided to convey the recording medium S thus fed. Registration rollers 55 are provided to synchronize the timing between the latent image formed on the photosensitive drum 1 and the recording medium S.

An intermediate transfer unit 5 onto which the toner image formed on each photosensitive drum 1 (1*a*, 1*b*, 1*c*, 1*d*) is transferred is provided above the cartridges 70 (70Y, 70M, 70C, and 70K). The intermediate transfer unit 5 includes a driving roller 56, a driven roller 57, primary transfer rollers 58 (58*a*, 58*b*, 58*c*, and 58*d*) each facing a different one of the photosensitive drums 1 of a corresponding color, an in-belt roller 59 at a position to face the secondary transfer roller 69, and a transfer belt 9 spanning across these members.

The transfer belt 9 rotationally moves while facing and being in contact with all the photosensitive drums 1, whereby primary transfer from the photosensitive drums 1 onto the transfer belt 9 is achieved with voltage applied to the primary transfer belts 58 (58*a*, 58*b*, 58*c*, and 58*d*). Then, voltage is applied to the in-belt roller 59 disposed in the transfer belt 9 and to the secondary transfer roller 69, whereby toner on the transfer belt 9 is transferred onto the recording medium S.

Image forming is performed as follows. The photosensitive drums 1 are rotated, uniformly charged by the charging roller 2, and then selectively exposed by the scanner unit 3. Thus, electrostatic latent images are formed on the photosensitive drums 1, and then are developed by the developing rollers 25. Thus, toner images of respective colors are formed on the photosensitive drums 1.

The registration rollers 55 convey the recording medium S to a secondary transfer position where the in-belt roller 59 and the secondary transfer roller 69 are in contact with each other with the transfer belt 9 in between, in synchronization with the image forming. Then, transfer bias voltage is applied to the secondary transfer roller 69, whereby the toner images of the respective colors on the transfer belt 9 are secondary transferred onto the recording medium S. Thus, a color image is formed on the recording medium S. The recording medium S on which the color image is formed is heated and pressed in the fixing unit 74 disposed in an upper portion of the apparatus main body 100, whereby the toner images are fixed. Then, the recording medium S is discharged to a discharge portion 75 by discharging rollers 72.

(Cartridge)

Next, the cartridge 70 according to the exemplary embodiment is described with reference to FIG. 3. FIG. 3 is a main cross-sectional view of the cartridge 70 containing toner. The cartridge 70Y containing yellow toner, the cartridge 70M containing magenta toner, the cartridge 70C containing cyan toner, and the cartridge 70K containing black toner have the same configuration. The cartridge 70 (70Y, 70M, 70C, 70K) includes a cleaning unit 26 (26*a*, 26*b*, 26*c*, 26*d*) and a developing unit 4 (4*a*, 4*b*, 4*c*, 4*d*).

(1. Cleaning Unit 26)

The cleaning unit 26 includes the photosensitive drum 1 (1*a*, 1*b*, 1*c*, 1*d*) as an image bearing member, a charging roller 2 (2*a*, 2*b*, 2*c*, 2*d*), a cleaning member 6 (6*a*, 6*b*, 6*c*, 6*d*), a cleaning frame 27 (frame), and a storage member 60 described below. The cleaning frame 27 has a predetermined thickness and a cross-sectional shape covering a range illustrated in FIG. 3.

The charging roller 2 and the cleaning member 6 are disposed on the circumference of the photosensitive drum 1. The cleaning member 6 includes an elastic member 7 formed of a rubber blade and a cleaning supporting member 8. The elastic member 7 as the rubber blade is disposed to have a distal end portion 7*a* in contact with the photosensitive drum 1 while being directed in a counter direction with respect to the rotation direction of the photosensitive drum 1. Thus, the residual toner is removed from the surface of the photosensitive drum 1 by the cleaning member 6 to fall into a removed-toner chamber 27*b*. A scoop sheet 21 that prevents the residual toner from leaking from the removed-toner chamber 27*b* is in contact with the photosensitive drum 1.

Driving force from a main body driving motor (not illustrated) serving as a driving source is transmitted to the cleaning unit 26, whereby the photosensitive drum 1 is drivingly rotated in accordance with the image forming operation. The charging roller 2 is rotatably attached to the cleaning unit 26 via a charging roller bearing 28. The charging roller 2 is pressed against the photosensitive drum 1 by a charging roller pressing member 48, and thus is rotated following the rotation of the photosensitive drum 1.

(2. Developing Unit 4)

The developing unit 4 illustrated in FIG. 3 includes the developing roller 25 serving as a developer-carrying member which is in contact with the photosensitive drum 1 that rotates in a direction indicated by an arrow P, and which rotates in a direction indicated by an arrow Q. The developing unit 4 further includes a developer container 31 serving as a developer frame that supports the developing roller 25 and a developer container chamber 31*a* serving as a container that contains toner to be supplied to the developing roller 25.

The developing roller 25 is rotatably supported by the developer container 31 via developer front and rear bearings (not illustrated) attached to both sides of the developer container 31. A toner supplying roller 34 and a developing blade 35 are disposed on the circumference of the developing roller 25. The toner supplying roller 34 is in contact with the developing roller 25, and rotates in a direction indicated by an arrow R. The developing blade 35 regulates the thickness of a toner layer on the developing roller 25.

A blowout prevention sheet 20 serving as a developing contact sheet is in contact with the developing roller 25 and prevents toner from leaking from the developer container 31. The developer container chamber 31*a* of the developer container 31 is provided with a developer stirring unit 36 that stirs the contained toner and conveys the toner to the toner supplying roller 34.

(Configuration for Inserting Cartridge into Apparatus Main Body)

Figure 4:
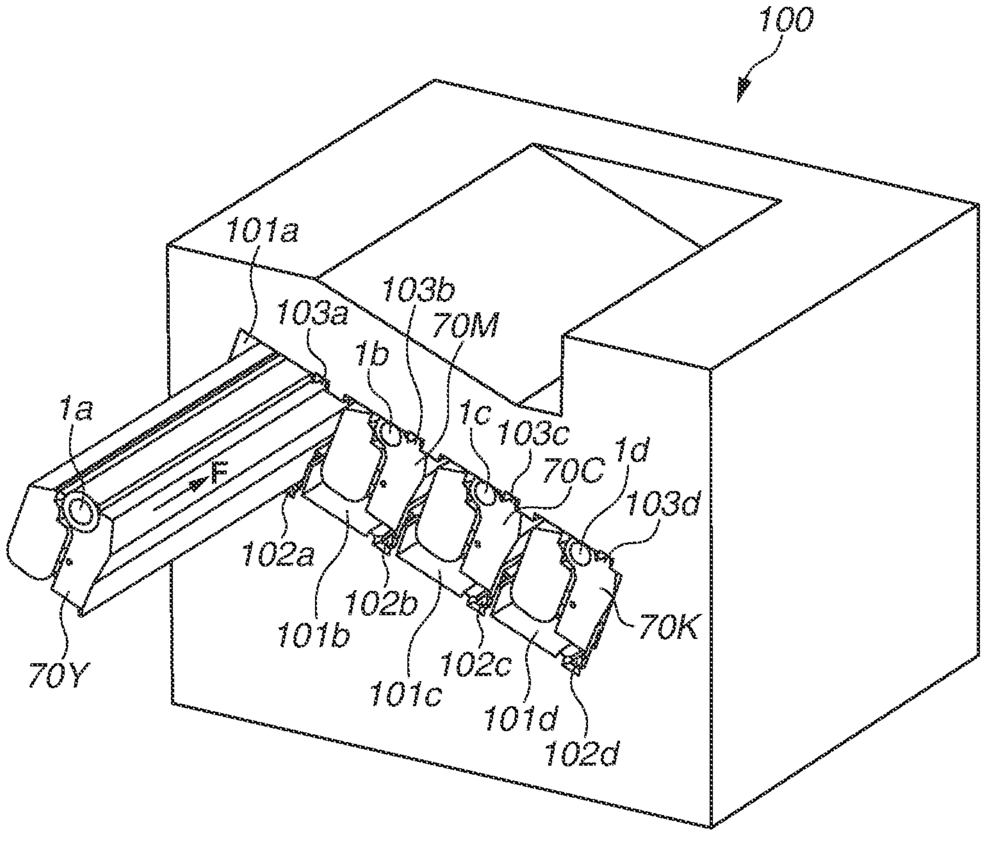
FIG. 4 is a schematic perspective view illustrating how the cartridge according to the first exemplary embodiment is attached to a main body of the image forming apparatus.

Next, a configuration for inserting the cartridge 70 (70Y, 70M, 70C, 70K) into the apparatus main body 100 is described with reference to FIG. 4. In the present exemplary embodiment, the cartridge 70 is inserted into an opening 101 (101*a*, 101*b*, 101*c*, 101*d*) in the apparatus main body 100. The cartridge 70 is inserted in an insertion direction (a direction indicated by an arrow F in the figure) from a front side to a rear side in an axial direction of the photosensitive drum 1. In the present exemplary embodiment, the axial direction is defined as a direction in parallel with a rotational axis direction of the photosensitive drum 1 and the developing roller 25. An upstream side and a downstream side of the insertion direction of the cartridge 70 are respectively defined as the front side and the rear side.

The apparatus main body 100 is provided with guide sections that guide the cartridge 70 that moves between positions in and out of the apparatus main body 100. More specifically, a main body attached upper guide section 103 (103*a*, 103*b*, 103*c*, and 103*d*) and a main body attached lower guide section 102 (102*a*, 102*b*, 102*c*, and 102*d*) are respectively disposed on an upper side and a lower side in the apparatus main body 100. The main body attached upper guide section 103 serves as a first main body guide section. The main body attached lower guide section 102 serves as a second main body guide section.

The main body attached upper guide section 103 and the main body attached lower guide section 102 each have a guiding shape extending along the insertion direction F of the cartridge 70. The cartridge 70 is inserted in the apparatus main body 100 as follows. More specifically, the cartridge 70 is placed on an insertion direction front side of the main body attached lower guide section 102, and then is moved in the insertion direction F along the main body attached upper guide section 103 and the main body attached lower guide section 102.

(Configuration of Arranging Information Storage Member)

The cartridge 70 is provided with the storage member (information storage member) 60. In the present exemplary embodiment, the storage member 60 (described in detail below) is provided on a lower surface of the cleaning frame 27 as illustrated in FIG. 1.

In the description in this specification, the lower surface of the cleaning frame 27 not only includes a lower outer circumference surface of the cleaning frame 27, but also includes a surface of a recess recessed from the lower outer circumference surface as described in detail below.

In the present exemplary embodiment, the lower outer circumference surface of the cleaning frame 27 has positions with different levels along the axial direction of the photosensitive drum 1. More specifically, a position (pressed section 27*a*) of the lower outer circumference surface at an end of the cleaning frame 27 in the axial direction is lower than a position (surface 27*c*) of the lower outer circumference surface at a center of the cleaning frame 27 in the axial direction, in a gravitational direction.

As illustrated in FIG. 1, the lower guide rail 52 and the upper guide rail 53, with which the cartridge 70 is inserted, are provided on left and right inner side surfaces of the apparatus main body 100. As described in detail below, upward pressing by a pressing member 50 provided in the apparatus main body 100 causes an upward movement of a main body electrical contact (electrode) 65 corresponding to a movement of the guide rail 52. Thus, the main body electrical contact 65 comes into contact with an electrical contact (electrode) of the storage member 60. In this process, the main body electrical contact 65 moves more than the pressing member 50.

Figure 5A:
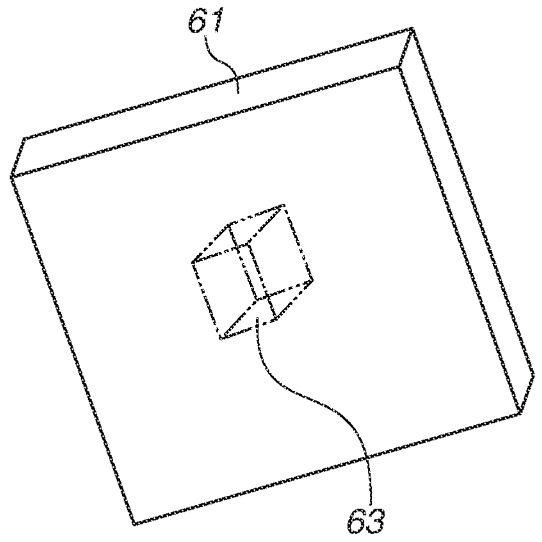
FIGS. 5A and 5B are each a schematic perspective view illustrating a configuration of the storage member in the cartridge according to the first exemplary embodiment.
Figure 5B:
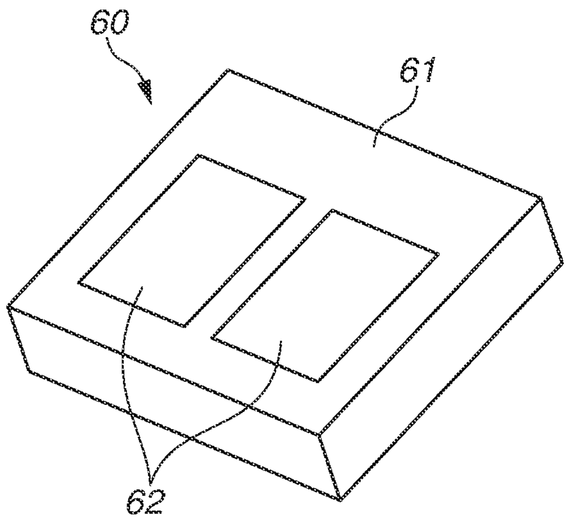

The storage member 60 has a substrate 61 with one surface side provided with a storage element 63 that stores information as illustrated in FIG. 5A, and the other surface side provided with storage element contacts (electrical contact of the storage member) 62 that are in electrical communication with the storage element as illustrated in FIG. 5B.

In a state where the cartridge 70 is at an attachment position to be attached to the apparatus main body 100, the storage element contact 62 of the cartridge 70 is in contact with the main body electrical contact 65 of the apparatus main body 100. Thus, communications are established so that the information (for example, the number of printed sheets) in the cartridge 70 can be detected by the apparatus main body 100.

Figure 6A:
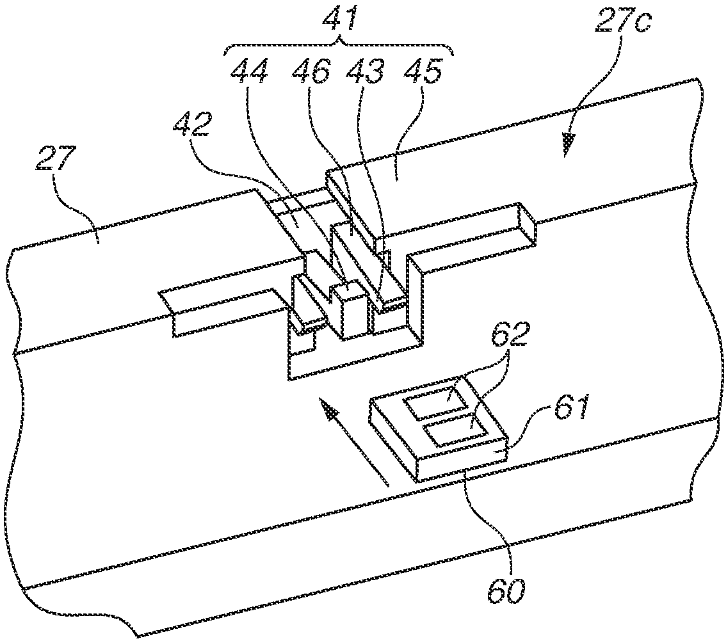
FIGS. 6A and 6B are each an exploded perspective view illustrating how the storage member is fixed in the cartridge according to the first exemplary embodiment.
Figure 6B:
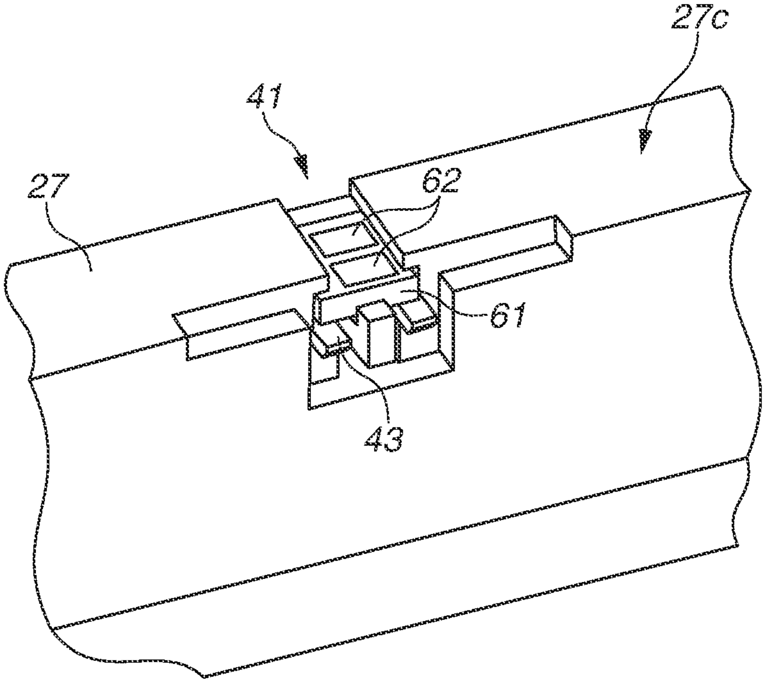

How the storage member 60 is attached to the cartridge 70 is described. As illustrated in FIG. 6, the storage member 60 is inserted into a slit 41 (supporting section) provided on a lower surface side of the cleaning frame 27, in a direction indicated by an arrow, with the side of the storage element contacts 62 facing outward.

The storage member 60 includes a plurality of the storage element contacts 62 arranged in a direction crossing the axial direction and the gravitational direction of the photosensitive drum 1. The arranged direction of the plurality of storage element contacts 62 is preferably orthogonal to each of the axial direction and the gravitational direction of the photosensitive drum 1. The cartridge can move in the direction orthogonal to the axial direction of the photosensitive drum only by an extremely small amount, and thus more stable connection with the electrical contact of the apparatus main body can be achieved.

The storage member 60 fits between a slit guide sections 45 and 46 (FIG. 6A) of the slit 41 to be positioned in the longitudinal direction of the cartridge 70. When a distal end portion of the storage member 60 comes into contact with a contact portion 42 of the slit 41, the storage member 60 is prevented from moving by an elastic claw (temporary joint member) 44 and thus is positioned in the lateral direction. In this state, a welded rib 43 (a distal end of the lower silt guide section 46) at an inlet of the slit 41 is thermally welded by ultrasonic welding or the like. The welded rib 43 in a state of being welded to prevent the storage member 60 from falling out (a state of the welded rib 43 in FIG. 8B) is cooled and solidified.

Figure 7:
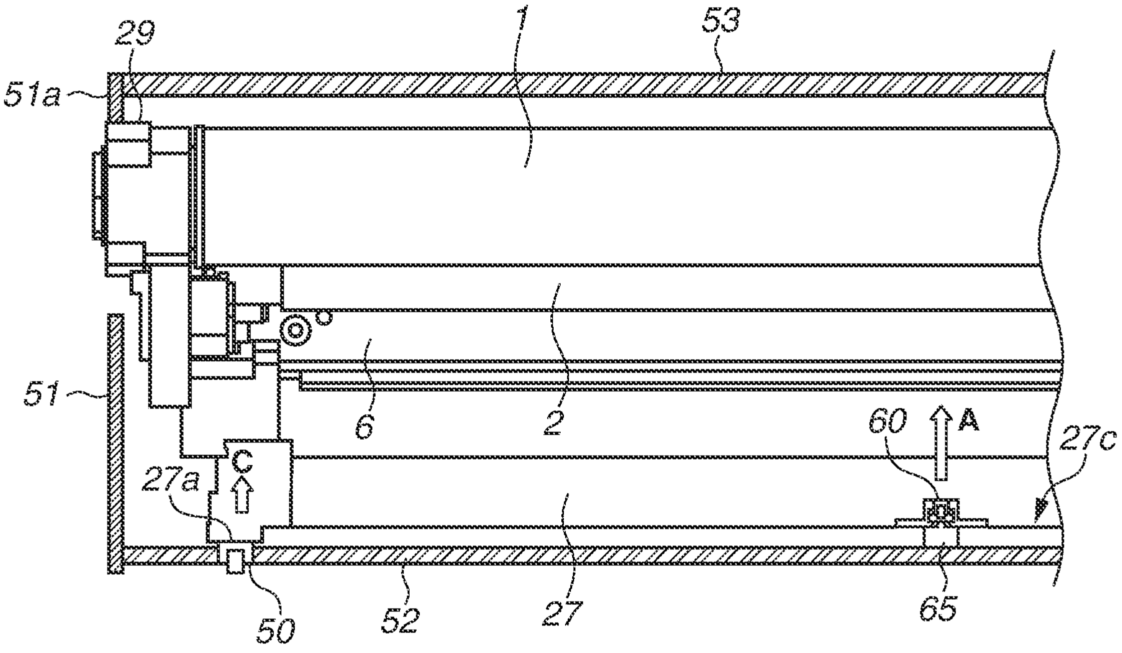
FIG. 7 is a diagram illustrating how the cartridge according to the first exemplary embodiment is positioned with a positioning section of the main body of the image forming apparatus by pressing force from the main body of the image forming apparatus.

As illustrated in FIG. 7, the cartridge 70 is pressed upward (C direction) by the pressing member 50 provided in the apparatus main body 100 (the pressing direction of the pressing member 50 is opposite to the gravitational direction in the present exemplary embodiment). A bearing 29 as a bearing member (that engages with the cleaning frame 27 and rotatably supports the photosensitive drum 1) is brought into contact with a positioning section 51*a* (first positioning section) of a rear side plate 51 provided to the apparatus main body 100, whereby positioning is achieved. Thus, the bearing 29 includes a first positioned section that comes into contact with the positioning section 51*a*. The first positioning section 51*a* and the first positioned section are disposed on one end side of the photosensitive drum 1 in the axial direction of the photosensitive drum 1. In other words, the first positioning section 51*a* and the first positioned section are disposed on the downstream side of the photosensitive drum 1 in the insertion direction F.

Thus, the cleaning frame 27 includes a pressed section 27*a* that receives pressing force from the pressing member 50 toward the positioning section 51*a* in the apparatus main body 100 (in the present exemplary embodiment the axial direction of the photosensitive drum 1 matches a direction connecting between the pressed section 27*a* and the storage member 60). The pressed section 27*a* is disposed on the upstream side of the first poisoned portion in the insertion direction F. As illustrated in FIG. 8, a plurality of the pressed sections 27*a* is provided on the rear side and the front side in the present exemplary embodiment.

Figure 11:
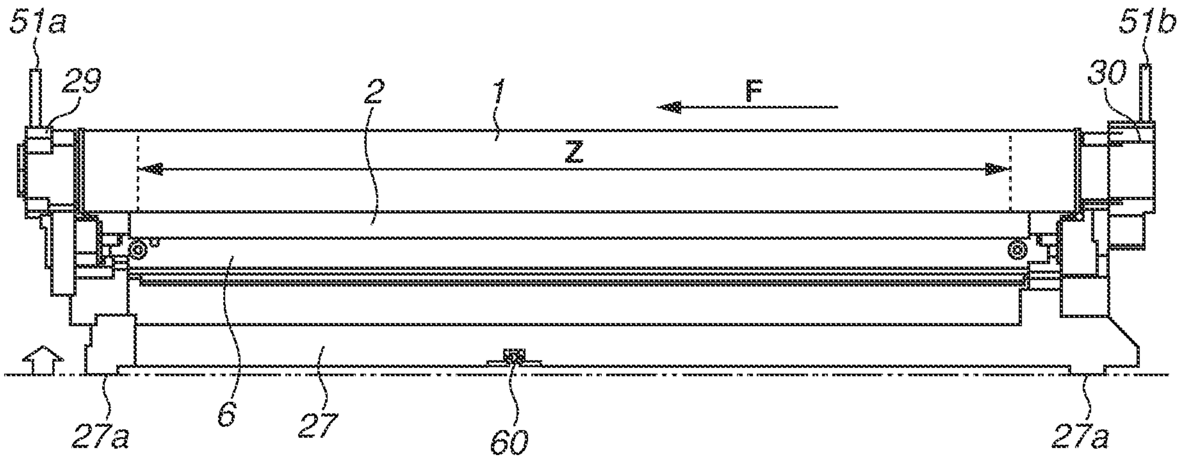
FIG. 11 is a diagram illustrating the cartridge according to the first exemplary embodiment.

In the present exemplary embodiment, as illustrated in FIG. 11, the apparatus main body 100 includes a second positioning section 51*b*. The cartridge 70 includes a second positioned section that is provided on the bearing 30 and comes into contact with the second positioning section 51*b*. The bearing 30 cooperates with the bearing 29 to rotatably support the photosensitive drum 1. The second positioning section 51*b* and the second positioned section are disposed on the other end side in the axial direction of the photosensitive drum 1. In other words, the second positioning section 51*b* and the second positioned section are disposed on the upstream side of the photosensitive drum 1 in the insertion direction F.

The plurality of pressed sections 27*a* is disposed on the inner side of the first positioned section and of the second positioned section in the axial direction of the photosensitive drum 1.

Figure 10A:
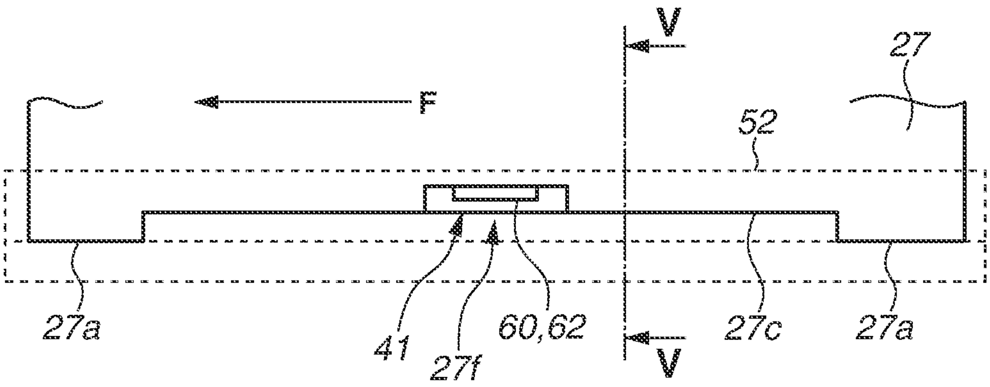
FIGS. 10A and 10B are each a diagram illustrating a cartridge guide according to the first exemplary embodiment.
Figure 10B:
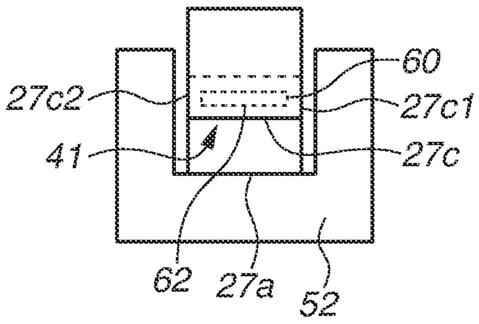

The guide for the cartridge 70 according to the present exemplary embodiment is described more in detail with reference to FIG. 10. FIG. 10A is a side view of the guide for the cartridge 70 as viewed in a direction orthogonal to the axial direction. FIG. 10B is a cross-sectional view of the guide for the cartridge 70 taken along a line V-V in FIG. 10A in a direction orthogonal to the axial direction (insertion direction).

As described above, the lower surface 27*c* is disposed in the lower portion of the cleaning frame 27 of the cartridge 70. The lower surface 27*c* is provided with the plurality of pressed sections 27*a* and the slit 41. The lower guide rail 52 of the apparatus main body 100 extends in the insertion direction. In FIG. 10A, the lower guide rail 52 is illustrated with a broken line.

In the present exemplary embodiment, the plurality of pressed sections 27*a* and side surfaces (27*c*1 and 27*c*2) of the lower surface 27*c* serve as cartridge guides that comes into contact with the lower guide rail 52 to be guided. More specifically, the pressed sections 27*a* and the side surfaces of the lower surface 27*c* serve as the cartridge guides that extend in the axial direction (insertion direction) of the photosensitive drum 1. The plurality of pressed sections 27*a* and the side surfaces of the lower surface 27*c* protrude beyond the cleaning frame 27 in a direction crossing the axial direction of the photosensitive drum 1 (orthogonal direction in the present exemplary embodiment).

The pressed sections 27*a* and the side surfaces of the lower surface 27*c* are cartridge guides disposed on both sides of the slit 41 and the storage member 60 in the axial direction of the photosensitive drum 1. In other words, the slit 41 and the storage member 60 (storage element contact 62) are disposed in an intermediate portion 27*f* of the cartridge guide in the axial direction of the photosensitive drum 1. The pressed sections 27*a* and the side surfaces of the lower surface 27*c* do not need to be entirely in contact with the lower guide rail 52, and may be separated from the lower guide rail 52 in the intermediate portion 27*f* for example.

The slit 41 and the storage member 60 are disposed at positions overlapping the cartridge guide in a direction crossing the axial direction and the gravitational direction of the photosensitive drum 1. Thus, the slit 41 and the storage member 60 are disposed at positions overlapping the cartridge guide in a cross section orthogonal to the axial direction of the photosensitive drum 1.

Thus, the slit 41 and the cartridge guides can be provided in a small space, whereby the cartridge 70 can be downsized.

Figure 9A:
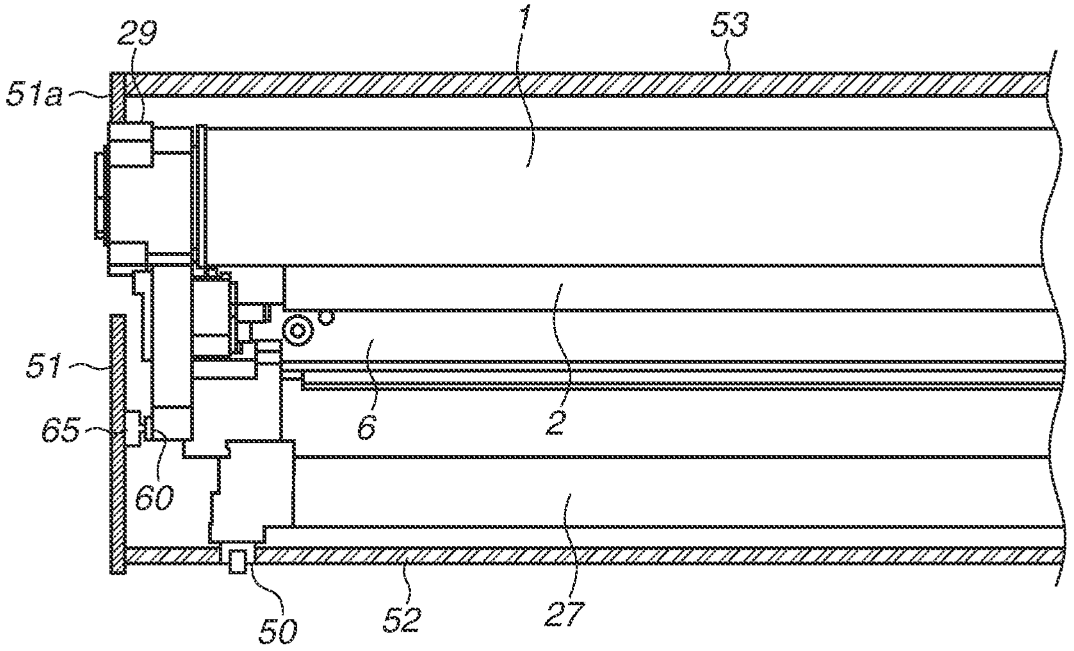
FIGS. 9A and 9B are each a diagram illustrating a conventional example.
Figure 9B:
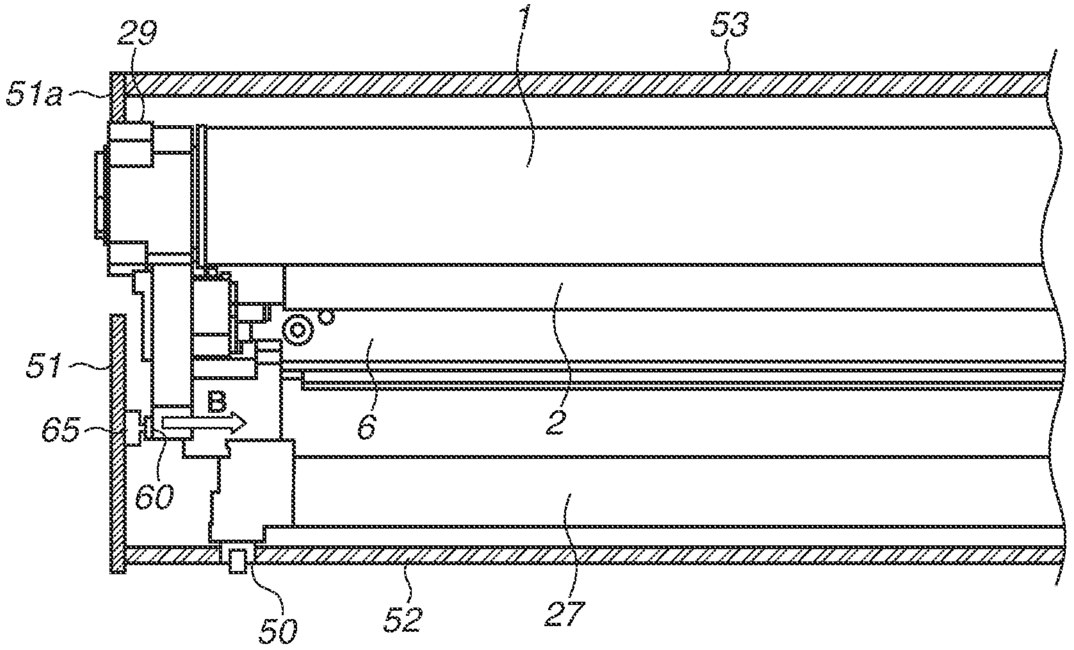

FIG. 9B illustrates a conventional configuration in which the storage member 60 is disposed on a side surface on a rear side of a cartridge that is detachably attachable to the apparatus main body by moving in the axial direction of the photosensitive drum 1. In this configuration, the cartridge receives force from the main body electrical contact 65 in a direction in which the cartridge is pulled out from the apparatus main body (B direction). Thus, large retaining force is required for preventing the cartridge from falling out, meaning that a user needs to apply large force to insert and remove the cartridge.

In view of this, the present exemplary embodiment features the configuration where the storage member 60 is disposed on the lower surface of the cartridge 70 (the lower surface of the cleaning frame 27) (see FIG. 7). With the configuration, the retaining force can be designed to be smaller than that required in the conventional configuration, whereby the cartridge 70 can be detached and attached with smaller force.

As illustrated in FIG. 7, the direction (A direction) of the force from the main body electrical contact 65 to the storage member 60 matches the positioning direction (C direction) of the cartridge 70, that is, the direction of the force from the pressing member 50. Thus, the cartridge can be positioned more accurately. Thus, the cartridge 70 receives force acting upward from the pressing member 50 on the pressed sections 27*a* on both end sides in the axial direction, and further receives force acting upward from the main body electrical contact 65 on the side of the center portion in the axial direction (mechanical contact between the storage member 60 and the main body electrical contact 65 is achieved). Thus, stronger pressing force is applied to the positioning section 51*a* to achieve higher positioning accuracy.

In the conventional configuration exemplarily illustrated in FIG. 9B, contact pressure for electrical connection is difficult to increase without increasing the retaining force for preventing the cartridge from falling out. In the present exemplary embodiment, the contact pressure for the electrical connection can be increased.

The storage member 60 is disposed at a portion around the center of the cleaning frame 26 in the longitudinal direction. Thus, upward force received by the cartridge is dispersed, whereby the cleaning frame 27 can be prevented from deforming. More specifically, when the cartridge 70 (cleaning frame 26) is hypothetically equally divided into three divided areas, the storage member 60 is disposed in the center one of the divided areas. Thus, the cleaning frame 27 can be prevented from deforming. As illustrates in FIG. 11, in the present exemplary embodiment, the first pressed section and the second pressed section are disposed between the first positioned section and the second positioned section. The storage member 60 and the storage element contact 62 are disposed between the first pressed section and the second pressed section. Thus, the first positioned section and the second positioned section of the cartridge 70 can be stably in contact with the positioning sections 51*a* and 51*b* of the main body.

Figure 8A:
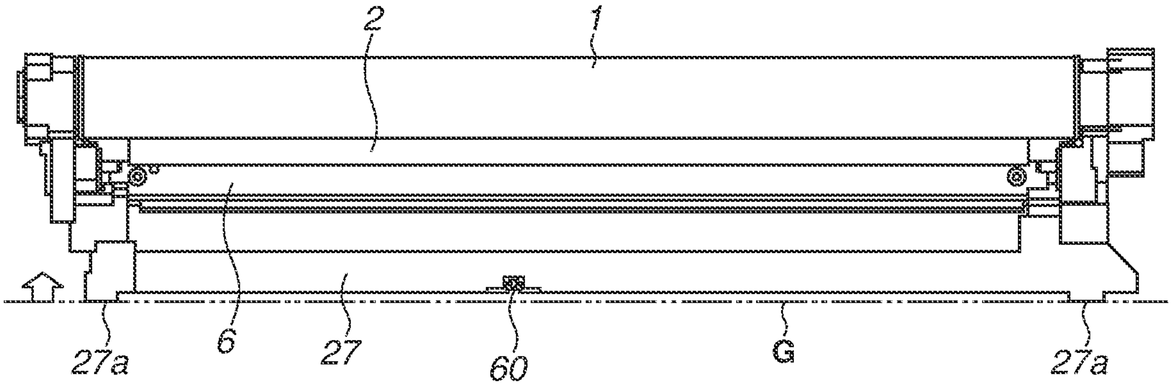
FIGS. 8A and 8B are each a diagram illustrating how the storage member is arranged in a recess in a frame in the cartridge according to the first exemplary embodiment.
Figure 8B:
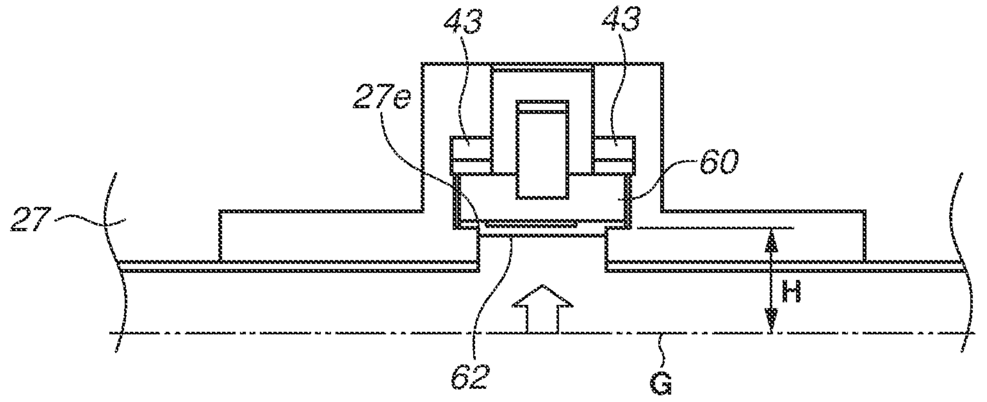

As illustrated in FIG. 8A, in the present exemplary embodiment, the storage member 60 is disposed more on the inner side than both end portions of the charging roller 2 (both end portions of the charging area) in the axial direction of the photosensitive drum 1. As illustrated in FIG. 11, the storage member 60 and the storage element contact 62 are disposed more on the inner side than both end portions of an area Z, where the latent image is formed, of the surface of the photosensitive drum 1. The storage member 60 is disposed outside an optical path of a laser beam emitted from the scanner unit 3 in a cross-sectional direction (direction orthogonal to the axial direction of the photosensitive drum 1). Thus, the storage member 60 disposed as described above does not hinder the exposure operation performed by the scanner unit 3. Thus, the cartridge 70 can be downsized.

In the present exemplary embodiment, as illustrated in FIG. 8, the storage member 60 is disposed in a recess with a bottom portion disposed more on a side of the photosensitive drum 1 than a plane G connecting between the plurality of pressed sections 27*a* (the first pressed section and the second pressed section). More specifically, the storage member 60 is disposed on a plane (surface of the recess) 27*e* disposed more on the side of the photosensitive drum 1 than the plane G. The storage member 60 arranged as described above is difficult to be touched by the user, and thus is effectively prevented from breaking by being in contact with the user.

The plane 27*e* as the lower surface of the cleaning frame on which the storage member 60 is disposed is separated from the plane G by a distance H in a direction opposite to the gravitational direction. More specifically, the distance H is preferably equal to or larger than 3 mm and is equal to or smaller than 20 mm (for example, 5 mm). The lower limit of the preferable range is set to be 3 mm as a distance long enough to prevent the contacting of a finger of the user despite its bulging shape. The higher limit of the preferable range is set to 20 mm so that the contact with the main body contact 65 can be easily achieved, with the recess form maintained without being a through hole.

An angle θ between the plane including the plurality of storage element contacts 62 and the horizontal plane illustrated in FIG. 3 is preferably 5° to 10°, and is more preferably 7°.

MODIFICATION

The present disclosure is not limited to the preferred exemplary embodiments described above, and can be changed and modified in various ways without departing from the gist of the present disclosure.

First Modification

The present disclosure is not limited to the configuration of the exemplary embodiment described above in which the storage member 60 is disposed on the lower surface of the cleaning frame 27 in the process cartridge (including the cleaning unit 26 and the developing unit 4).

More specifically, a configuration may be employed in which the cleaning unit and the developing unit are separately provided and are detachably attachable to the apparatus main body of the image forming apparatus, instead of being integrated to be the process cartridge. In other words, a dual configuration may be employed in which the cleaning cartridge serving as the cleaning device and the developing cartridge serving as the developing device are individually detachably attached.

In this configuration, the cleaning cartridge and the developing cartridge may each include the storage member. In such a case, the storage members may be disposed on lower surfaces of both cartridges to achieve inserting and removing with much smaller force.

It is to be noted that a certain level of advantage can be achieved with the storage member disposed not on the lower surfaces of both cartridges, but disposed on the lower surface of only one of the cartridges. For example, the cleaning cartridge may have the lower surface provided with the storage member, whereas the developing cartridge may have a side end surface in the axial direction provided with the storage member as illustrated in FIG. 9.

This configuration can be employed for the following reason. As can be seen in the cross-sectional view in FIG. 3, the cleaning unit corresponding to the cleaning cartridge has a small cross-sectional area. Thus, when a driving force receiving member is disposed on a side surface, there is only a small space left for the storage member, and thus a design freedom is compromised. Thus, the storage member is disposed on the lower surface to achieve a much higher design freedom. As can also be seen in the cross-sectional view in FIG. 3, the developing unit corresponding to the developing cartridge has a large cross-sectional area. Thus, the side end surface in the axial direction has a relatively large area, and thus is likely to have an enough area to provide the storage member.

As another alternative configuration, in addition to the dual configuration, the developing device may be built in the apparatus main body, and the cleaning cartridge, having the storage member 60 provided on the lower surface of the cleaning frame 27, alone may be detachably attachable to the apparatus main body. Also in this configuration, preferably, the cleaning frame 27 includes the pressed section 27*a* that receives the pressing force from the pressing member of the apparatus main body, and a direction connecting between the pressed section 27*a* and the storage member 60 matches the axial direction of the photosensitive drum 1, so that larger pressing force can be applied to achieve more accurate positioning.

Similarly, the photosensitive drum serving as the image bearing member may be built in the apparatus main body, and the developing cartridge, having the storage member 60 disposed on the lower surface of the developer container 31 as the developing frame, alone may be detachably attachable. Also in this configuration, preferably, the developer container 31 includes the pressed section that receives the pressing force from the pressing member of the apparatus main body toward the positioning section of the apparatus main body, and the direction connecting between the pressed section and the storage member 60 matches the axial direction of the developing roller 25, so that larger pressing force can be applied to achieve more accurate positioning.

In the process cartridge (including the cleaning unit 26 and the developing unit 4), the storage member 60 may be disposed on the lower surface of the developer container 31 serving as the developing frame. Also in this configuration, preferably, the developer container 31 includes the pressed section that receives the pressing force from the pressing member of the apparatus main body toward the positioning section of the apparatus main body, and the direction connecting between the pressed section and the storage member 60 matches the axial direction of the developing roller 25, so that larger pressing force can be applied to achieve more accurate positioning.

A second exemplary embodiment is described below. Generally, the portions that are described in the first exemplary embodiment will not be described. Still, a configuration according to the present exemplary embodiment may be combined with the configuration according to the first exemplary embodiment.

Figure 12:
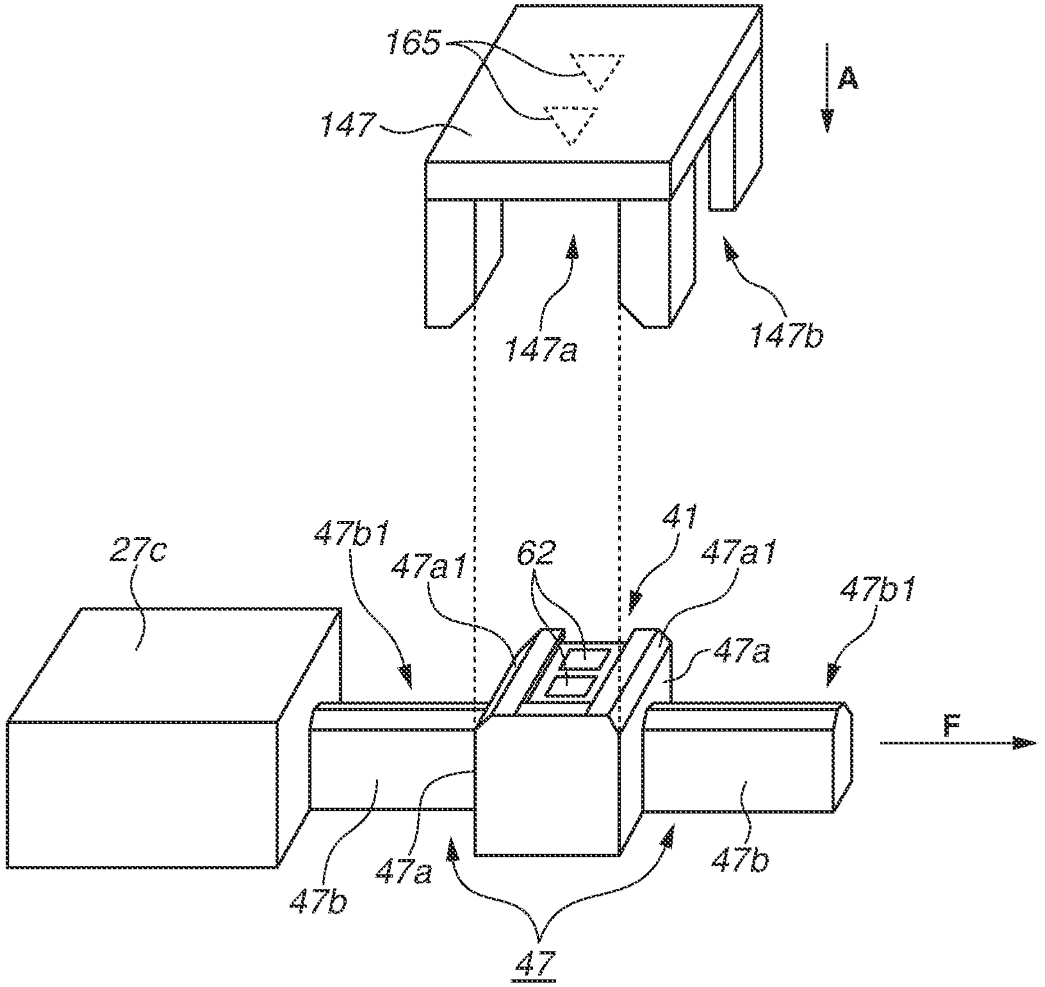
FIG. 12 is a diagram illustrating a storage member and a slit according to a second exemplary embodiment.

FIG. 12 is a schematic view of a configuration around the storage member 60 and the slit 41 according to the present exemplary embodiment. The slit 41, having the configuration described in the first exemplary embodiment, is simplified in FIG. 12.

The apparatus main body according to the present exemplary embodiment includes a holder 147 that holds main body electrical contacts 165. The holder 147 includes a first restricted member 147*a* and a second restricted member 147*b*.

Restricting sections 47 are provided on both sides of the slit 41 in the axial direction (insertion direction) F of the photosensitive drum 1. The restricting sections 47 restrict a position of the holder 147 (the position of the main body electrical contacts 165). The restricting sections 47 each include a first restricting section 47*a*. A first inclined surface 47*a*1 is formed on a distal end of the first restricting section 47*a*. The restricting sections 47 each include a second restricting section 47*b*. A second inclined surface 47*b*1 is formed on a distal end of the second restricting section 47*b*.

The holder 147 moves along the direction of the force from the main body electrical contacts 165 to the storage member 60 (A direction). The first restricted member 147*a* engages with the first restricting section 47*a*. Thus, the position of the holder 147 (the position of the main body contacts 165) is restricted in the axial direction of the photosensitive drum 1. The second restricted member 147*b* engages with the second restricting section 47*b*. Thus, the position of the holder 147 (the position of the main body contacts 165) is restricted in the direction crossing the axial direction of the photosensitive drum 1 (orthogonally in the present exemplary embodiment). As described above, the first restricting section 47*a* and the second restricting section 47*b* can engage with the holder 147 in a direction crossing the axial direction of the photosensitive drum 1 (from the lower side in the gravitational direction in the present exemplary embodiment). As described above, the position of the main body contact 165 is restricted with respect to the storage element contact 62. The first inclined surface **47*a*1 and the second inclined surface 47*b*1 facilitate the engagement with the holder 147**.

In the present exemplary embodiment, the first restricted member **147*a* and the second restricted member 147*b* are recesses (grooves). The first restricting section 47*a* and the second restricting section 47*b* are protrusions (walls). If the first restricting section 47*a* and the second restricting section 47*b* are recesses, wall surfaces need to be provided around the recesses. All things considered, the configuration according to the present exemplary embodiment can be achieved with the restricting section of a small size, and thus the cartridge 70 can be downsized. The slit 41** according to the present exemplary embodiment is provided on the cartridge guide, as in the first exemplary embodiment.

The present disclosure can provide a cartridge, a process cartridge, and an image forming apparatus offering high usability with the cartridge being easily insertable by a user.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus comprising:

a main body including a main body contact and a guide member including a recess; and a cartridge configured to be attached to the main body in an attaching direction, the cartridge including a photosensitive drum, a developing roller configured to contact the photosensitive drum, a memory including a memory contact, the memory contact configured to contact and electrically connected to the main body contact, and a frame including a cartridge guide holding the memory, wherein the cartridge guide is disposed on an end portion of the frame in a first direction orthogonal to the attaching direction, wherein in an attached state where the cartridge is attached to the main body, at least part of the cartridge guide is inserted into the recess so that at least part of the memory contact is inserted in the recess.

2. The image forming apparatus according to claim 1, wherein in the attached state, the photosensitive drum is disposed outside the recess with respect to the first direction.

3. The image forming apparatus according to claim 2, wherein the guide member is configured to contact the cartridge guide so as to guide the cartridge guide.

4. The image forming apparatus according to claim 3, further comprising:

a belt; and a plurality of cartridges, each of the plurality of cartridges being the cartridge, wherein the belt is configured to contact the photosensitive drum of each of the plurality of cartridges.

5. The image forming apparatus according to claim 1, wherein the guide member is configured to contact the cartridge guide so as to guide the cartridge guide.

6. The image forming apparatus according to claim 1, further comprising:

a belt; and a plurality of cartridges, each of the plurality of cartridges being the cartridge, wherein the belt is configured to contact the photosensitive drum of each of the plurality of cartridges.

7. The image forming apparatus according to claim 1, wherein the main body includes a positioning portion and a pressing portion, the pressing portion is configured to press the cartridge in a positioning direction so that the cartridge is pressed against the positioning portion, and wherein the memory is disposed on an upstream side of the photosensitive drum with respect to the positioning direction.

8. The image forming apparatus according to claim 1, wherein the cartridge includes a contacting roller and a roller pressing member configured to urge the contacting roller so that the contacting roller is pressed against the photosensitive drum.

9. The image forming apparatus according to claim 8, wherein, with respect to a direction orthogonal to a rotation axis direction of the photosensitive drum, the contacting roller and the roller pressing member are closer to the photosensitive drum than the memory is.

* * * * *